United States Patent Office 2,748,355
Patented May 29, 1956

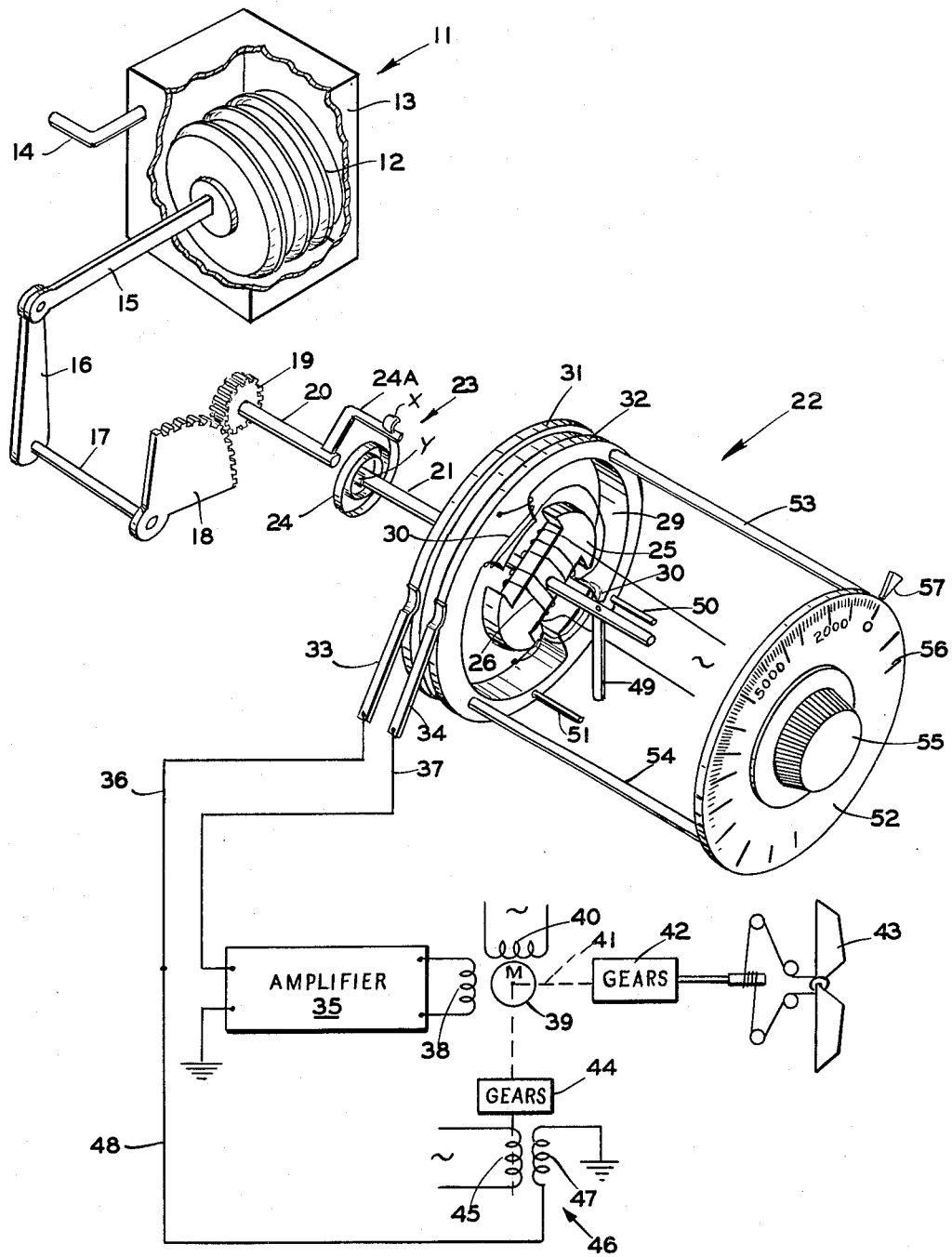

2,748,355

ALTITUDE RESPONSIVE SIGNAL GENERATOR

John Jarvis, Dumont, N. J., assignor to Bendix Aviation Corporation, Teterboro, N. J., a corporation of Delaware Application March 9, 1951, Serial No. 214,799

2 Claims. (Cl. 336—30)

This invention relates to electrical control systems and more particularly to means for limiting the electrical output of a signal developing device without affecting the electrical signal sensitivity thereof. In another aspect, the instant invention is directed to a control system wherein the electrical null of a signal developing device may be preselected to provide for varying conditions of operation.

Electrical control systems for positioning an object in accordance with the displacement of a controlling member ordinarily utilize a signal developing device which is actuated by the controlling member to develop a signal whose magnitude and phase is dependent upon the amount and direction of displacement of the controlling member from a reference position. The maximum position of the controlled object, however, must be limited in some systems regardless of the amount of displacement of the controlling member. This is usually the case in aircraft control systems wherein the extent of movement of the craft's control surfaces must be limited in order that the craft not be subjected to undue stress and strain. An example of this is an altitude control for aircraft wherein a control member, such as an aneroid subjected to atmospheric pressure, actuates a signal developing device to effect a signal output which energizes a servo motor connected for positioning the elevator surface to control the craft's flight altitude level. It may be readily appreciated that if the craft is suddenly displaced from a predetermined altitude level by an updraft or downdraft, the aneroid will respond to the change in atmospheric pressure and cause the elevator control surface to be moved to return the craft to the predetermined altitude level. If the craft displacement be unusually large, the corresponding signal output will be effected to move the elevator beyond a maximum safe position and thereby subject the craft to undue stress and strain. Furthermore, to preselect a desired flight altitude, means must be provided for developing a signal output large enough to displace the craft to its preselected altitude without positioning the elevator beyond a maximum safety limit.

The present invention contemplates a servo control system wherein the electrical signal output due to the relative displacement of the rotor and stator of an inductive signal developing device is limited without affecting the electrical signal sensitivity; a pair of adjustable stops being secured to the stator and cooperating with an arm secured to the rotor to limit the signal output. In the contemplated system, an aneroid displaces the rotor relative to the stator through a spring loaded coupling which serves to take up the motion of the aneroid when the rotor reaches its limit of rotation with respect to the stator, and a manually operable positioning means displaces the stator relative to the rotor to preselect an altitude by changing the null position of the signal developing device.

An object of the present invention, therefore, is to provide a servo control system wherein novel means are provided for limiting the electrical signal output from a signal developing device without affecting the electrical sensitivity thereof.

Another object is to provide novel means for preselecting the altitude at which an aircraft is to be operated without displacing an elevator control surface beyond maximum safety limits.

A further object is to provide novel altitude selecting means wherein the stator of a signal developing device is displaced relative to a rotor element to effect an output signal which effects displacement of an elevator control surface, and continued displacement of said stator element after a given angular displacement will cease to effect any increase in the signal output.

Another object is to provide a novel and automatic altitude controller for an aircraft whose control on the craft is limited when the craft is subjected to excessive updrafts or downdrafts.

The above and other objects and advantages of the invention will appear more fully hereinafter from a consideration of the description which follows, taken together with the accompanying drawing wherein one embodiment of the invention is illustrated. It is to be expressly understood, however, that the drawing is for the purpose of illustration and description only, and is not intended as a definition of the limits of the invention.

In the single figure of the drawing one embodiment of the invention is illustrated in terms of the application thereof to an altitude control for aircraft.

Turning now to the single figure of the drawing, reference character 11 designates an aneroid comprising an expansible and contractible bellows 12 enclosed in an airtight container 13 mounted on an aircraft. A tube 14 connected to the static pressure side of a Pitot tube mounted on the craft subjects bellows 12 to atmospheric pressure so that the latter accurately responds by its expansion and contraction to the altitude at which the craft is operated. Connected to receive the motion of bellows 12 is a lever 15 which has connected at its other end an arm 16. Arm 16, when driven by lever 15, angularly displaces a shaft 17 and its gear sector 18. Gear sector 18 meshes with a pinion 19 formed on one end of a shaft 20 which is rotatable in suitable bearings not shown. Shaft 20 is connected to a rotor shaft 21 of a single developing device 22 by a torsion storing over-travel means 23 which includes a pre-loading spring 24 having one end secured to a projecting finger 24A that is fixed to shaft 20 and the other end Y is secured to rotor shaft 21. Spring 24 is so constructed that in the absence of stress thereon by either shaft, the spring maintains shafts 20 and 21 in identical angular positions. Upon rotation of shaft 20 however, in either direction, rotor shaft 21 is displaced an angular amount equal to the angular displacement of shaft 20 from a reference position.

Signal developing device 22 is shown as comprising a rotor 25 having a single phase rotor winding 26 energized from a suitable source of alternating current and a two pole rotatable stator 29. The stator 29 is normally fixed with respect to rotor 25 but may be rotated by means to be described hereinafter. Disposed on the poles of stator 29 is a single phase stator winding 30 having the ends thereof electrically connected to slip rings 31 and 32 respectively, which are insulated from each other. Angular displacement of rotor winding 26 develops in stator winding 30 a signal of a phase and magnitude corresponding to the direction and amount of displacement of rotor 25 from a null position relative to stator 29.

A pair of brushes 33 and 34 are connected to slip rings 31 and 32 respectively, to pick up the signal output of signal developing device 22. The signal output is fed to a conventional vacuum tube amplifier 35, shown as a box, by way of conductors 36 and 37 connected to brushes 33 and 34. The output of amplifier 35 energizes the variable phase winding 38 of a two phase reversible servo motor 39 which has a fixed phase winding 40 constantly energized from an alternating current source. The motor 39 is driven in one direction or the other an amount determined by the phase and magnitude of the output of amplifier 35. Motor shaft 41 is connected through a gearing arrangement 42, shown in box form, to displace an elevator control surface 43. Connected to the output of motor 39 through a second gearing arrangement 44, shown in box form, is a rotor winding 45 of an inductive follow up device 46. Rotor winding 45 is energized with alternating current to induce in a stator winding 47, a follow up signal of a phase and magnitude corresponding to the direction and amount of displacement of rotor winding 45 from a reference position and which is algebraically added to the signal output from signal developing device 22 by way of a conductor 48 connected to conductor 36. The follow up signal cancels the signal output when rotor windings 26 and 45 are in correspondence, in a manner well known to those skilled in the art.

By reason of the foregoing, if the craft be suddenly displaced from the flight altitude level at which it is operating, by an updraft or downdraft, bellows 12 will expand or contract to thereby displace rotor 25 relative to stator 29. The signal developed by device 22 operates motor 39 to position elevator 43 in the proper direction to return the craft to the desired flight altitude level.

Coming now to the novel arrangement constituting the subject matter of the present invention, rotor shaft 21 is provided with a projecting pin 49 which is adapted for engagement with either one of two spaced limit or stop pins 50 and 51 carried by stator 29. The limit or stop pins may be adjustably mounted on the stator to define adjustable limits for rotor displacement relative to the stator whereby a safe maximum signal output for device 22 will be provided which will not cause movement of the elevator surface beyond required safety limits. Rotor 25 is shown in the drawing positioned relative to the stator in such a manner that pin 49 is located midway between stop pins 50 and 51. This is the normally centered electrical null or zero position of the device at which time no signal is available at the output thereof. Displacement of the rotor from the centered position, in one direction or another, will develop a signal in the stator winding of a phase determined by the direction of displacement and of a magnitude determined by the amount of such displacement. In order to prevent 180 degrees ambiguity rotor motion is confined by the limit stops to pass through a single electrical null, the limit stops also determining the safe maximum displacement of the elevator.

If the displacement of the craft, from the flight altitude level at which it is operating by an updraft or downdraft is unusually large, the bellows 12 attempts to displace rotor 25 an amount greater than that permitted by stops 50 and 51. In this case, when pin 49 engages one of the stops, further displacement of rotor 25 is prevented and the spring 24 takes up the excess movement due to the expansion or contraction of bellows 12. Thus, the signal output of the signal device is limited to prevent the elevator 43 from being displaced beyond maximum safe displacements at all times. Since the elevator 43 has been displaced in the meantime due to the angular displacement of rotor 25 with respect to stator 29, the craft will begin to return to its original flight altitude. As the craft approaches its original altitude level the bellows 12, through the intermediate gearing arrangement described, decreases the stress on spring 24 until the pin 49 is disengaged from one of the stops, and the rotor reaches electrical zero when the craft is at its original altitude level. When the pin 49 is centralized the stress on spring 24, due to bellows 12, is also zero and the system is at a null. Thus, the electrical output of signal developing device 22 is limited without affecting its signal sensitivity.

Positioning or null preselecting means for preselecting any desired altitude comprise a circular disc 52 secured in parallel relation to stator 29 by a pair of connecting rods 53 and 54 which extend along axes parallel to the longitudinal axis of the stator. The disc 52 has fixed thereto a manually operable knob 55. Stator 29 and disc 52 are both mounted in suitable bearings (not shown) for angular displacement relative to a fixed index 57 and upon actuation of knob 55, both are advanced a similar angular amount.

Disc 52 bears indicia 56 which read in feet of elevation and are calibrated in terms of absolute pressure. Fixed index 57 is located at the periphery of the disc to cooperate with the indicia 56. Since both the bellows 12 and indicia 56 are calibrated in terms of absolute pressure, the spacing of the indicia may be made proportional to the deflection of the bellows and the desired altitude of the craft may be preselected by actuating knob 55 until the desired elevation may be read from the disc by index 57. When rotor 25 is at electrical zero, or null, with pin 49 centralized between limit stops 50 and 51, the bellows 12 is in a static condition thereby indicating that the craft is at a preselected altitude. The electrical zero position of rotor 25 may then be read on disc 52 by index 57. In order to preselect a desired elevation, knob 55 is actuated to displace stator 29 with respect to rotor 25 so that the structure heretofore described is in effect placed in a dynamic state, and the craft will seek to attain the selected elevation corresponding to the reading selected by displacement of disc 52.

Considering now the operation of the arrangement described, let it be assumed that the craft has been operating at an elevation of 2000 feet. At this time, the index will be aligned with the numeral 2000 on disc 52 and rotor 25 will be at electrical zero, with the pin 49 centralized between stops 50 and 51. Should the human pilot wish to bring the craft to another elevation, for example, 5000 feet, he moves knob 55, until the index 57 is aligned with the numeral 5000. Assuming that the angular distance between the numerals 2000 and 5000 is greater than the angular distance between pin 49 and stop 50, stop 50 will engage the pin, and carry it therewith in its travel, whereby further relative displacement between the stator and rotor ceases. The magnitude of the signal output therefore, is limited by stop 50 and is determined by the angular distance defined by a point midway between the stops and the location of stop 50. Since rotor shaft 21 is displaced in a clockwise direction it will wind up spring 24. Shaft 20 will not be displaced because the connecting linkage between it and the bellows 12 offers too great a resistance. Moreover, since the output of signal developing device 22 is limited by stop 50, the angular displacement of the elevator is limited to a safe displacement limit. As the craft moves upwardly in response to the displacement of elevator 43, the bellows 12 will begin to expand thereby displacing shaft 20 in a clockwise direction to relieve the stress on spring 24 exerted by rotor shaft 21. As bellows 12 expands sufficiently to relieve the tension impressed on spring 24 by motion of rotor shaft 21, further bellows motion displaces the rotor and its pin 49 away from stop 50. Finally, as the craft reaches its preselected altitude, bellows 12 will cease to expand and rotor 26 will have been displaced to the preselected null position with the pin 49 centralized again with respect to stops 50 and 51. Rotor 26 is now at electrical zero with respect to the stator and the electrical output of device 22 will become zero. Thus, the new null position of the rotor 26 with respect to index 56 will correspond to the numeral 5000 on disc 52. Thus, the null of the system may be preselected beyond the limits defined by the stops without affecting the signal sensitivity of the signal developing device 22.

The limitation of relative motion between rotor 25 and stator 29 in no way limits the system as a whole since the spring loaded coupling 23 will permit the entire system to operate as if unrestricted. The relative position of stops 50 and 51 with respect to the centralized position of pin 49 may be varied to suit the particular requirements of the system, subject of course, to the requirement that the rotor 25 pass through only one electrical null in order to avoid ambiguity in the system and that elevator control surface displacement is maintained within safe limits.

The instant invention is described in connection with an altitude control for aircraft but it is apparent that the novel preselecting null device may be employed in any system wherein it is desired to preselect a null without affecting the signal sensitivity of a signal developing device.

Although a single embodiment of the invention has been illustrated and described in detail, it is to be expressly understood that the invention is not limited thereto. Various changes may be made in the design and arrangement of the parts without departing from the spirit and scope of the invention as will now be understood by those skilled in the art.

I claim:

1. An altitude preselecting device for aircraft comprising a base, altitude response means having an end fixed to said base and the other end movable relative to said one end in response to change in altitude, an inductive device having rotor and stator elements which are rotatable relative to each other for producing an electrical output corresponding in phase and amplitude to the direction and extent of relative rotation, motion transmission means connecting said other end of said altitude responsive means and rotor element for rotation of said rotor element by said altitude responsive means in response to change in altitude, means for rotating said stator element to a position corresponding to a selected altitude, means for limiting the relative rotation of said rotor and stator elements to a predetermined extent whereby the amplitude of said output is limited and said rotor element is rotated with said stator element after said stator element is rotated said predetermined extent relative to said rotor element, and said transmission means including torsion storing over-travel means, whereby the relative rotation of said rotor element and said altitude responsive means due to said stator element is absorbed by said overtravel means without injury to said altitude responsive means.

2. An altitude presetting device for aircraft comprising a signal developing device having a pair of elements which are relatively displaceable from a null position for developing an electrical signal, a base, pressure responsive means having one end fixed to said base and the other end movable relative to said one end in response to change in altitude, an over-travel means connecting a first of said elements and said other end of said pressure responsive means for moving the former by the latter, an altitude presetting device connected to the second of said elements for moving said second element to a position corresponding to a desired altitude, stop means on said signal developing device operable for limiting relative displacement of said elements whereby the movement of said second element by said presetting device displaces said second element relative to said first element to develop a corresponding signal until said stop means becomes operable and thereafter displaces both elements together to limit said signal, said over-travel means including resilient means yieldable when said first element is moved relative to said other end of said pressure response means so that the displacement of both elements by said presetting device does not affect the operation of said pressure responsive means.

References Cited in the file of this patent

UNITED STATES PATENTS

| | | |
|---|---|---|
| 2,405,228 | Mayrath | Aug. 6, 1946 |
| 2,415,092 | Frische et al. | Feb. 4, 1947 |
| 2,415,429 | Kellogg 2nd et al. | Feb. 11, 1947 |
| 2,512,902 | Rossire | June 27, 1950 |
| 2,597,892 | Nash | May 27, 1952 |